United States Patent
Xing et al.

(10) Patent No.: US 10,519,377 B1
(45) Date of Patent: Dec. 31, 2019

(54) LIQUID CRYSTAL COMPOSITION OF NEGATIVE MONOMER CONTAINING CYCLOPENTYL CYCLOHEXENYL AND LIQUID CRYSTAL DISPLAY ELEMENT OR LIQUID CRYSTAL DISPLAY THEREOF

(71) Applicant: Shijiazhuang Chengzhi Yonghua Display Material Co., Ltd, Shijiazhuang (CN)

(72) Inventors: Wenxiao Xing, Shijiazhuang (CN); Lei Zhao, Shijiazhuang (CN); Guoliang Yun, Shijiazhuang (CN); Xing Zhang, Shijiazhuang (CN); Gang Wen, Shijiazhuang (CN); RuiXiang Liang, Shijiazhuang (CN); Yuanyuan Zhai, Shijiazhuang (CN); YanLi Dong, Shijiazhuang (CN)

(73) Assignee: SHIJIAZHUANG CHENGZHI YONGHUA DISPLAY MATERIAL CO., LTD, Shijiazhuang, Hebei Prov. (CN)

(*) Notice: Subject to any disclaimer, the term of this patent is extended or adjusted under 35 U.S.C. 154(b) by 0 days.

(21) Appl. No.: 16/125,005

(22) Filed: Sep. 7, 2018

(51) Int. Cl.
| | |
|---|---|
| G02F 1/1333 | (2006.01) |
| C09K 19/46 | (2006.01) |
| G02F 1/1343 | (2006.01) |
| C09K 19/44 | (2006.01) |
| C09K 19/12 | (2006.01) |
| C09K 19/30 | (2006.01) |
| C09K 19/34 | (2006.01) |
| G02F 1/137 | (2006.01) |

(52) U.S. Cl.
CPC .............. *C09K 19/46* (2013.01); *C09K 19/12* (2013.01); *C09K 19/3003* (2013.01); *C09K 19/3028* (2013.01); *C09K 19/3068* (2013.01); *C09K 19/3098* (2013.01); *C09K 19/3402* (2013.01); *C09K 19/44* (2013.01); *G02F 1/137* (2013.01); *G02F 1/134363* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3036* (2013.01); *C09K 2019/3037* (2013.01); *C09K 2019/3075* (2013.01); *C09K 2019/3077* (2013.01); *C09K 2019/3425* (2013.01); *G02F 2001/13712* (2013.01)

(58) Field of Classification Search
CPC .... C09K 19/46; C09K 19/12; C09K 19/3003; C09K 19/3028; C09K 19/3068; C09K 19/3098; C09K 19/3402; C09K 19/44; C09K 2019/122; C09K 2019/123; C09K 2019/3004; C09K 2019/3009; C09K 2019/301; C09K 2019/3016; C09K 2019/3036; C09K 2019/3037; C09K 2019/3075; C09K 2019/3077; C09K 2019/3425; G02F 1/137; G02F 1/1333; G02F 1/134363; G02F 2001/13712
USPC ...................................................... 252/299.61
See application file for complete search history.

(56) References Cited

U.S. PATENT DOCUMENTS

| | | | |
|---|---|---|---|
| 9,428,693 B2* | 8/2016 | Wen | C09K 19/30 |
| 9,517,990 B2* | 12/2016 | Yun | C09K 19/30 |

* cited by examiner

*Primary Examiner* — Geraldina Visconti
(74) *Attorney, Agent, or Firm* — Muncy, Geissler, Olds & Lowe, P.C.

(57) ABSTRACT

Disclosed are a liquid crystal composition and a display element or display using the liquid crystal composition, wherein the liquid crystal composition contains one or more compounds of general formulas I, II and III,

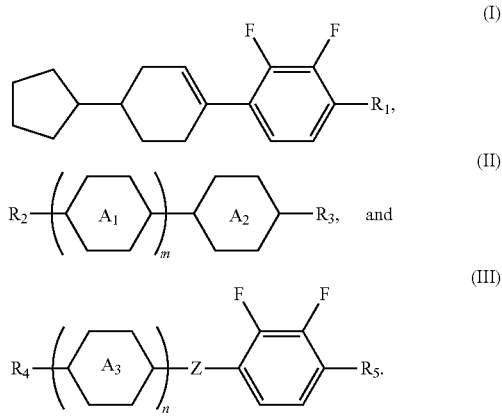

The liquid crystal composition disclosed in the present invention has an excellent performance, an optical anisotropy in the range of 0.080 to 0.150, a low rotary viscosity, a fast response time, and good chemical, optical and thermal stabilities, and is very suitable for manufacturing liquid crystal display elements, particularly suitable for active matrix display elements, such as active matrix displays using a VA, FFS or IPS mode.

9 Claims, No Drawings

LIQUID CRYSTAL COMPOSITION OF NEGATIVE MONOMER CONTAINING CYCLOPENTYL CYCLOHEXENYL AND LIQUID CRYSTAL DISPLAY ELEMENT OR LIQUID CRYSTAL DISPLAY THEREOF

TECHNICAL FIELD

The invention of the present application belongs to the field of liquid crystal compounds, and particularly relates to a negative dielectric anisotropy liquid crystal composition and a liquid crystal display element or liquid crystal display using the liquid crystal composition.

BACKGROUND ART

Display is a process of converting an electrical signal (data information) into visible light (visual information), and devices for realizing display, i.e., Man-Machine Interface (MMI) and Flat Panel Display (FPD), are currently the most popular class of display devices. In FPD, Liquid Crystal Display (LCD) is the earliest developed and commercialized product. At present, thin film transistor liquid crystal displays (TFT-LCD) have become a mainstream product in LCD applications.

The development of TFT-LCD has gone through a long period of basic research, and after achieving large-scale production and commercialization, TFT-LCD products are made larger in size and wider in application due to their advantages of thinness, being environmentally friendly, high performance, etc. TFT-LCD applications can be seen everywhere, whether in small-sized mobile phone screens or large-sized notebook PCs or monitors and large-sized liquid crystal televisions (LCD-TV). Early commercial TFT-LCD products basically uses a Twisted Nematic (TN) display mode, and the largest problem thereof is that the viewing angle is not large enough. With the increase in the size of TFT-LCD products, especially for the application of TFT-LCD in the TV field, an In-Plane Switching (IPS) display mode with a wide viewing angle characteristic has been developed and utilized. The IPS display mode was first published in a paper in 1974 by American R. Soref, and German G Baur proposed the application of IPS as a wide viewing angle technique to TFT-LCD. In 1995, Hitachi, Japan developed the first 13.3-inch IPS mode wide viewing angle TFT-LCD product in the world. Korean Hyundai Corporation has developed a Fringe Field Switching (FFS) display mode TFT-LCD product on the basis of IPS.

TFT-LCD is a liquid crystal display device under the control of a TFT switch, and the electrical and optical characteristics of liquid crystals directly affect the display effect. Different types of liquid crystals have different electrical and optical characteristics and different display modes. Performance parameters that have a larger influence on liquid crystal materials used for TFT-LCD include: a working temperature range, a driving voltage, a response speed, a contrast ratio, a hue, a tone, a viewing angle, etc., wherein the driving voltage is more affected by the dielectric constant anisotropy and the elastic coefficient, and the viscosity and elastic coefficient affect the response speed of a liquid crystal material, and the phase difference and refractive index anisotropy affect the hue of the liquid crystal display. In the past, those cyano-containing compounds cannot satisfy these conditions, and only fluorine-containing liquid crystal materials are applicable for the manufacture of TFT-LCDs.

In addition, one kind of liquid crystal molecules cannot meet all the requirements of TFT-LCD display, and a combination of many kinds of liquid crystal molecules is necessary. By combining many kinds of liquid crystal molecules, various physical property requirements for liquid crystal materials can be achieved, and these requirements mainly include 1) a high stability. 2) a moderate birefringence. 3) a low viscosity. 4) a larger dielectric anisotropy. 5) a wide temperature range. The ideal storage temperature range is −40° C. to 100° C. and in the case of special applications such as vehicle display, the temperature may be widened to −40° C. to 110° C.

Nowadays, technologies for LCD products have been very mature, successfully solving the technical difficulties of a viewing angle, a resolution, a colour saturation, a brightness, etc., and the display performance thereof has approached or exceeded those of CRT displays. Large-sized and medium-sized LCDs have gradually occupied the mainstream position of flat panel displays in the respective fields thereof. In order to pursue higher performance specifications, accelerating response time has become the goal pursued by various device manufacturers.

Specifically, the response time of a liquid crystal is limited by the rotary viscosity $\gamma 1$/elastic constant K of the liquid crystal, and therefore from the viewpoint of the liquid crystal material, it is necessary to try to reduce the rotary viscosity $\gamma 1$ of the liquid crystal medium while increasing the elastic constant K to achieve an accelerated response time. Furthermore, it is found in actual researches that the rotary viscosity and elastic constant are a pair of contradictory parameters; lowering the rotary viscosity causes the elastic constant to decrease, leading to a failure of achieving the target of reducing the response time. For devices, the goal of accelerating response time can be achieved by reducing cell thickness d, and this is easy to implement; however, since the delayed amount $\Delta$nd of a device is fixed, it is required to increase the optical anisotropy $\Delta$n thereof in terms of liquid crystal material for reducing cell thickness d.

Therefore, in order to meet the above-mentioned requirements, it is necessary to develop a series of compounds with superior performance to solve the problem of the liquid crystal display having a low response time.

SUMMARY OF THE INVENTION

In view of the problem that negative liquid crystal compounds with terminal alkyl group-based cyclohexenyl has been patented and the technical problems of negative liquid crystal compounds containing cyclohexyl with a cyclopentyl substituent having a low refractive index, the present invention is intended to provide a liquid crystal medium of a negative liquid crystal compound containing cyclopentyl cyclohexenyl. The liquid crystal composition has an optical anisotropy in the range of 0.080 to 0.150, a wide nematic temperature range, a good low temperature performance, a good intermiscibility, and also good light and heat stabilities, and further has a low rotary viscosity and a faster response time, and the iquid crystal composition is suitable for high performance displays.

In order to solve the above-mentioned technical problems, the technical solution used by the present invention is as follows:

the present invention provides a liquid crystal composition, characterized in that said liquid crystal composition comprises a first component consisting of one or more compounds represented by general formula I, a second component consisting of one or more compounds represented by general formula II, and a third component consisting of one or more compounds represented by general formula III:

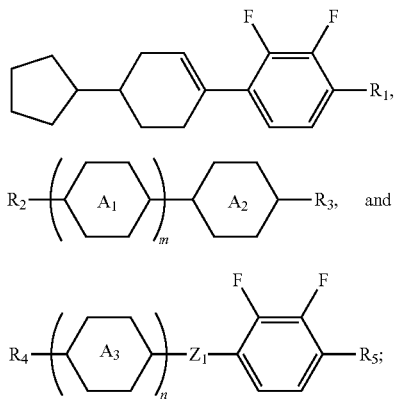

wherein $R_1$, $R_2$, $R_3$, $R_4$ and $R_5$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_4$ and $R_5$ may be substituted with a cycloalkylene having a carbon atom number of 3-5;

m represents 1 or 2, and n represents 0 or 1;

Z represents a single bond, —COO—, —$CH_2O$— or —$CH_2CH_2$—;

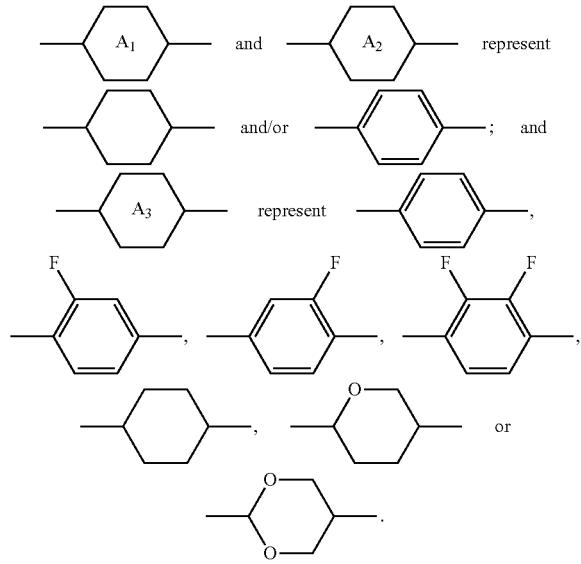

Due to the use of the above-mentioned technical solution, the technical progress achieved by the present invention lies in that the invention discloses a negative dielectric anisotropy liquid crystal medium, which has an excellent performance and an optical anisotropy in the range of 0.080 to 0.150, and has a low rotary viscosity, a faster response time, an appropriate negative dielectric anisotropy and a good low temperature reliability, and the liquid crystal medium is very suitable for the manufacture of VA mode liquid crystal display elements, particularly suitable for active matrix display elements such as active matrix displays using FFS or IPS, MVA, PVA, PSVA and $UV^2A$ effects.

The compound represented by general formula I as provided by the present invention not only evades the patentablity problems of negative liquid crystal compounds with alkyl as a terminal group, but also improves the clearing point and the K33 value thereof due to the introduction of the cyclopentyl substituent; and due to the introduction of cyclohexenyl, the refractive index of the negative liquid crystal compound is improved compared to those involving cyclohexyl. Thus, a liquid crystal medium containing a liquid crystal compound represented by general formula I has a high clearing point, a large dielectric anisotropy, a large K33 value, and a high refractive index. Since the liquid crystal compound represented by general formula I has such advantages, it will become a desired liquid crystal compound for liquid crystal media for active matrix display elements in the future.

A dielectrically neutral compounds represented by general formula II as provided by the present invention generally have a smaller viscosity and a good mutual intersolubility. According to actual requirements, a compound of general formula II can be added in an appropriate amount to adjust various properties of the liquid crystal medium.

Among the dielectrically negative compounds represented by general formula III as provided by the present invention, compounds having a linear alkyl group at the terminal can be used to reduce the pretilt angle of the liquid crystal to improve the black state of the liquid crystal, improve the contrast ratio and adjust the degree of order of the liquid crystal, so as to improve the residual image level of the liquid crystal in a display device; since compounds having a linear alkenyl group at the terminal has a large K value, the fall time of the response time thereof can be indirectly increased, due to the effect of its own elastic constant, after the power is removed.

A further improvement of the technical solution of the present invention lies in that in said liquid crystal composition, the content in mass percentage of the first component is 1-55%, the content in mass percentage of the second component is 1-55%, and the content in mass percentage of the third component is 1-50%.

A further improvement of the technical solution of the present invention lies in that said compound represented by general formula I is specifically a compound represented by formulas I1 to I3:

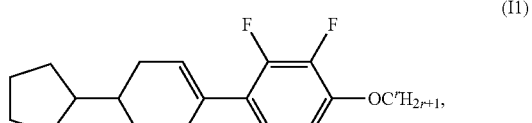

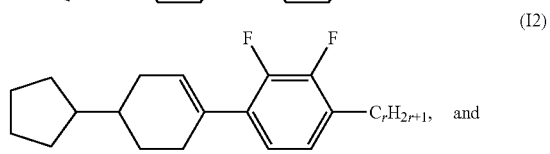

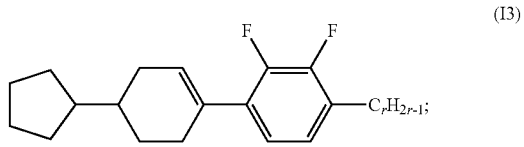

said compound represented by general formula II is specifically a compound represented by formulas II1 to II5,
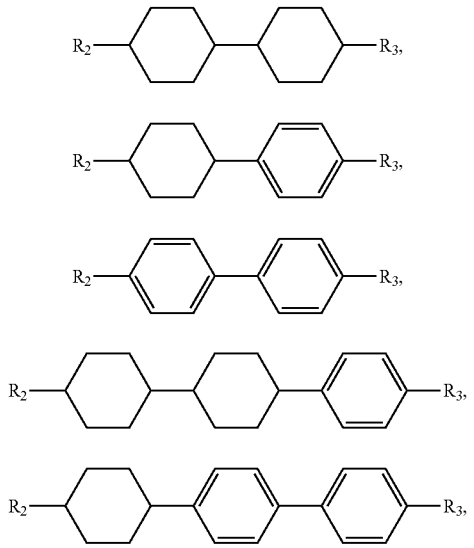
said compound represented by general formula III is specifically a compound represented by formulas III1 to III17,
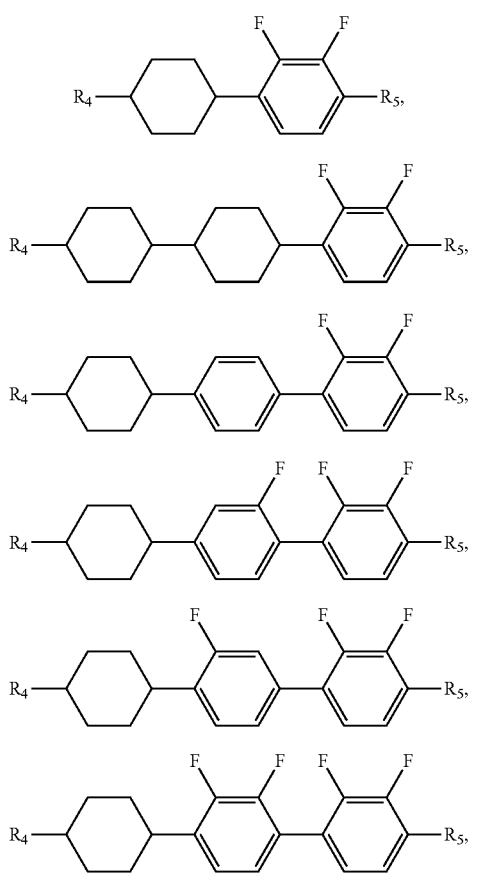
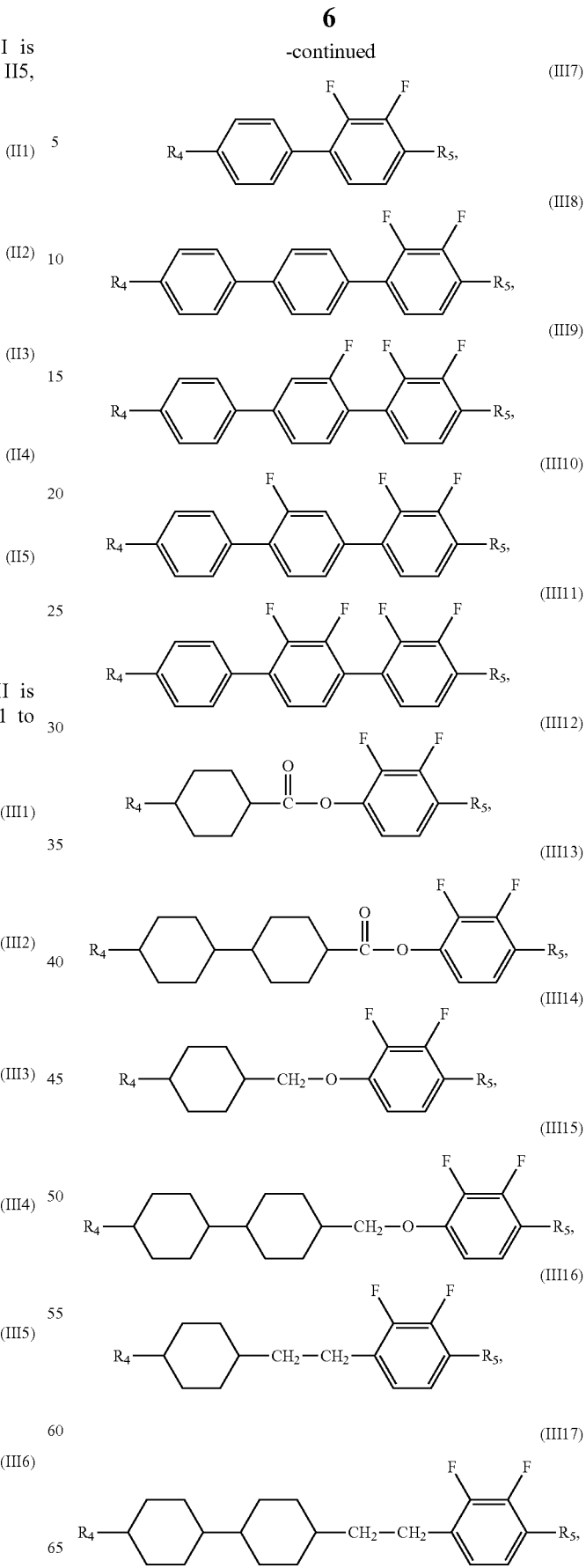

wherein r represents an integer of 1 to 5; and $R_2$, $R_3$, $R_4$ and $R_5$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_4$ and $R_5$ may be substituted with a cycloalkylene having a carbon atom number of 3-5.

Preferably, said compound represented by general formula I is specifically a compound represented by formulas I1-1 to I3-10:

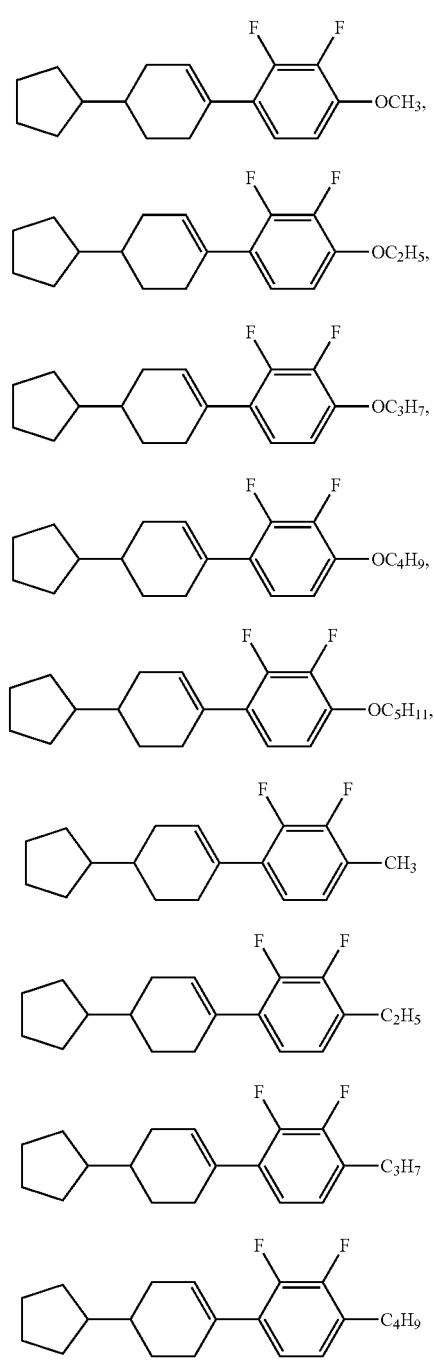

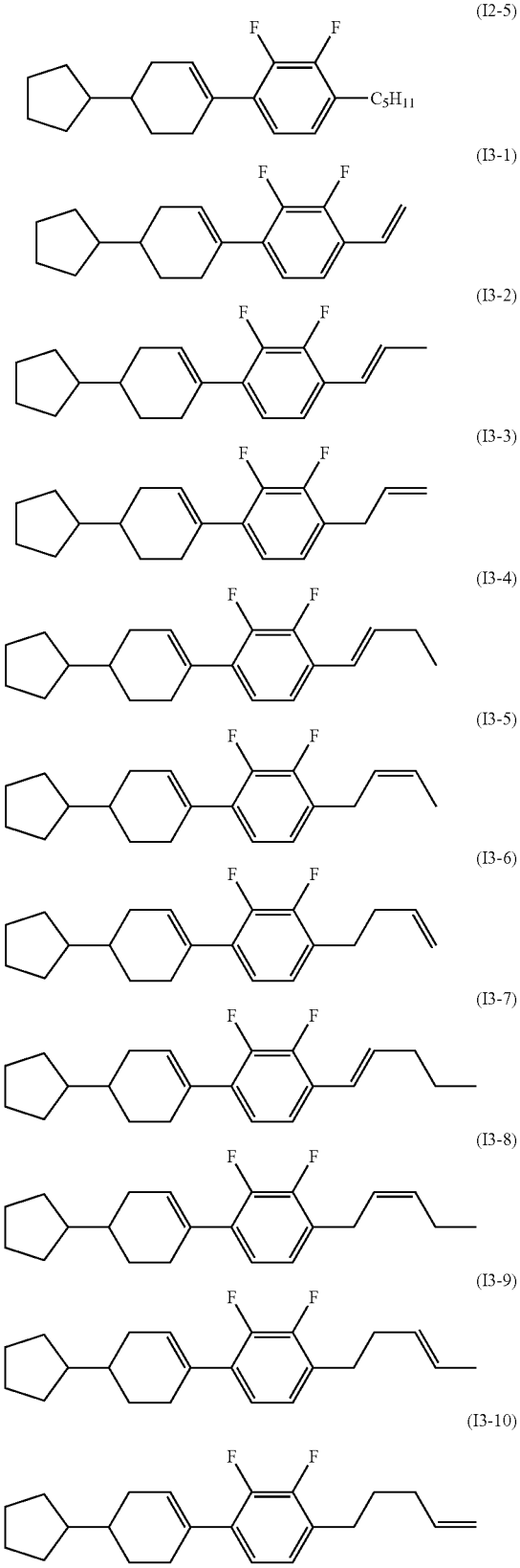

Preferably, said compound represented by general formula II is specifically a compound represented by formulas II1-1 to II5-4,

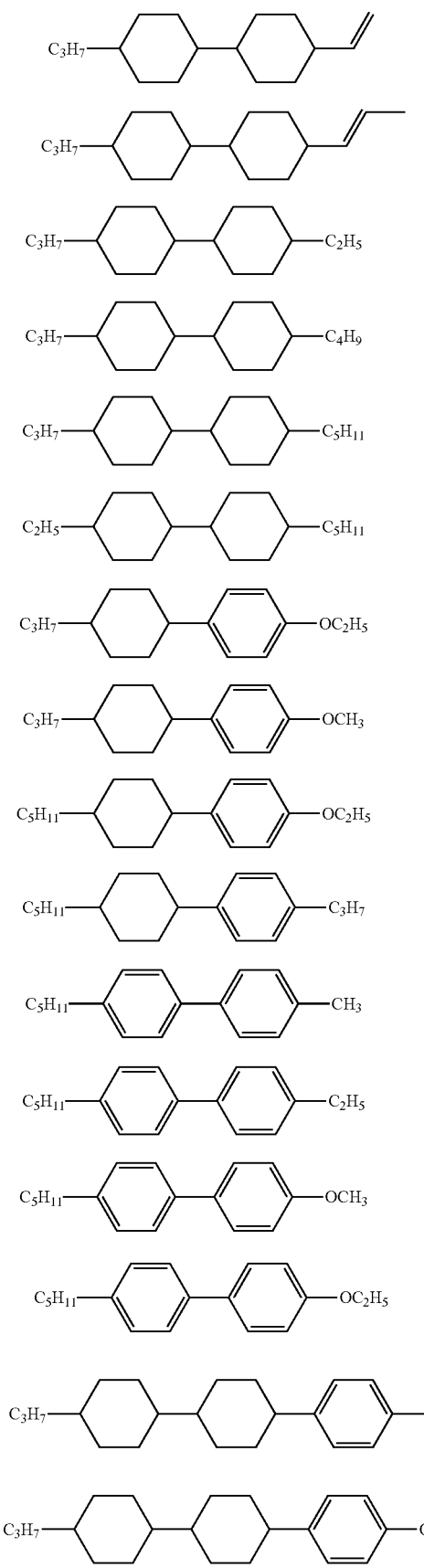
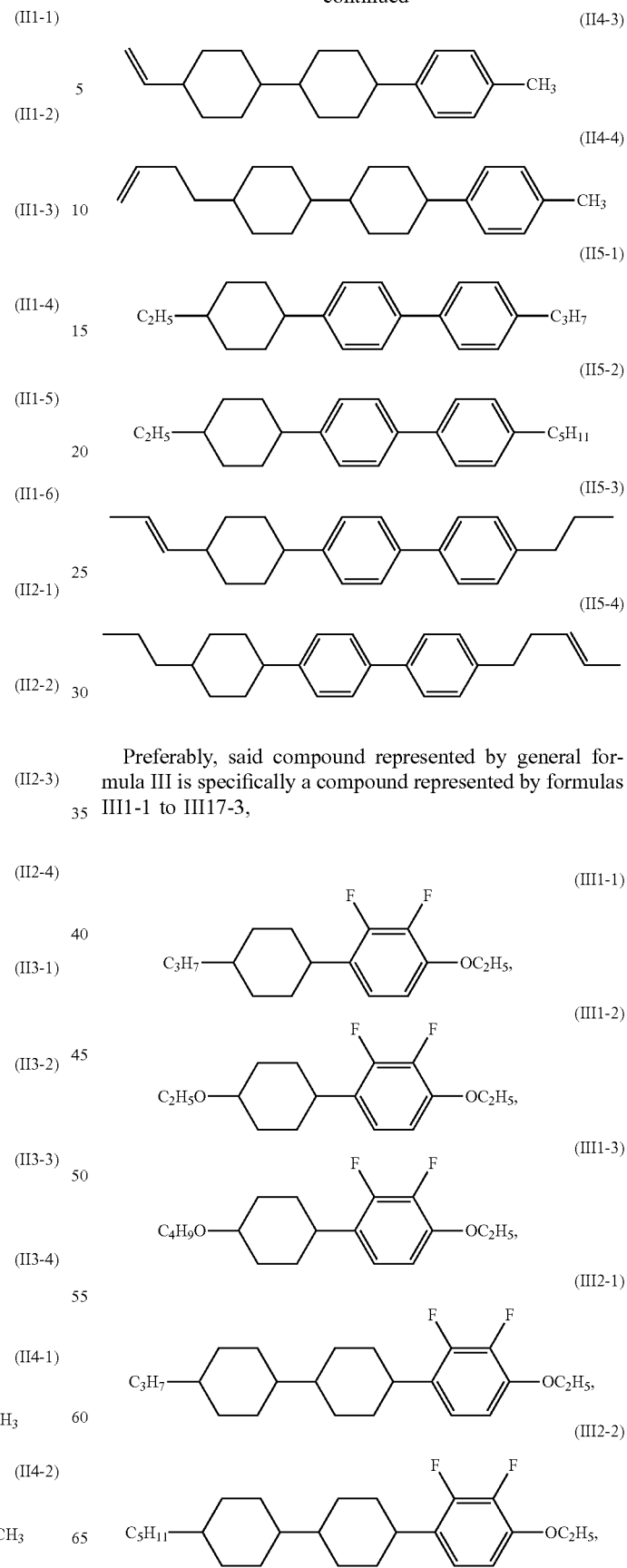
Preferably, said compound represented by general formula III is specifically a compound represented by formulas III1-1 to III17-3,

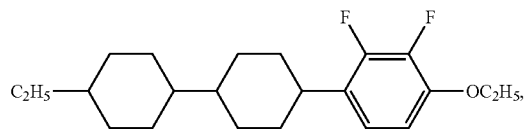
(III2-3)
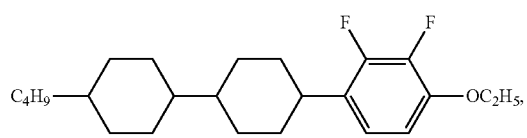
(III2-4)
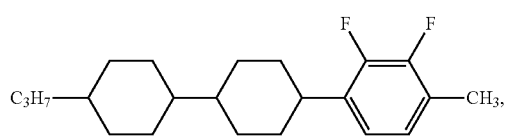
(III2-5)
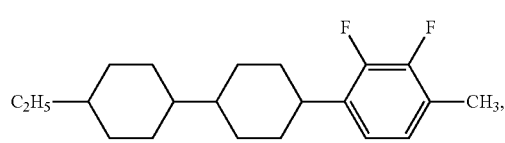
(III2-6)
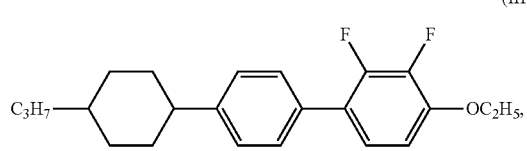
(III3-1)
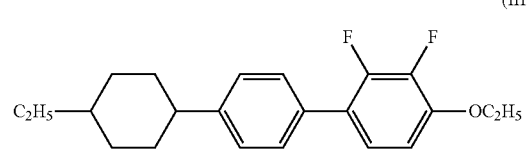
(III3-2)
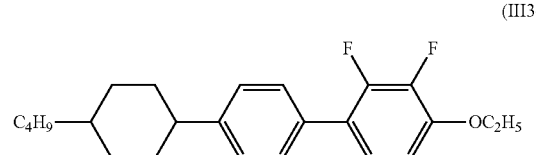
(III3-3)
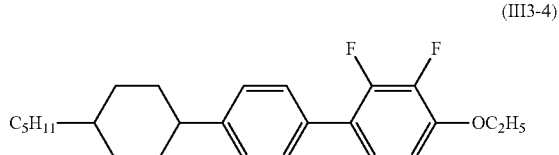
(III3-4)
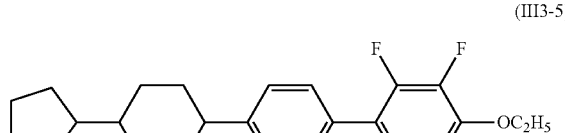
(III3-5)
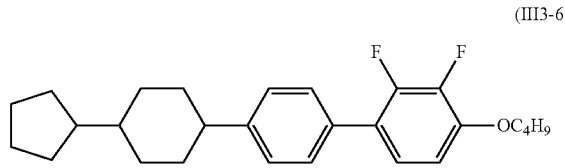
(III3-6)
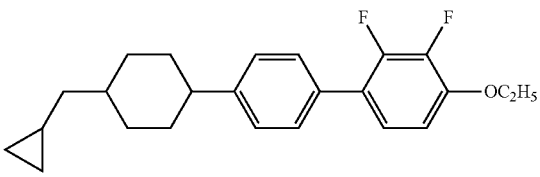
(III3-7)
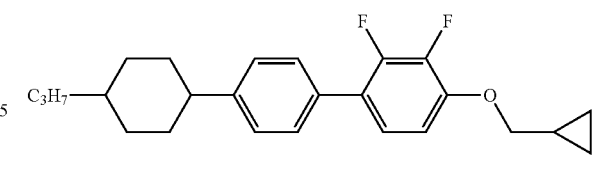
(III3-8)
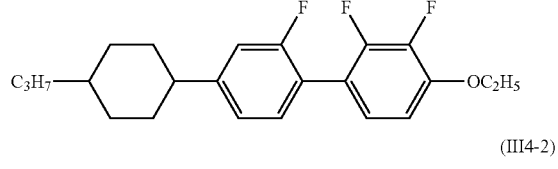
(III4-1)
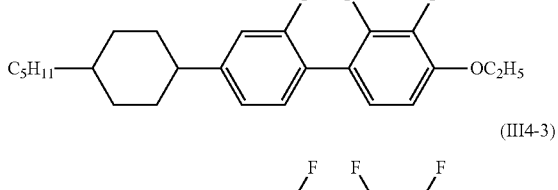
(III4-2)
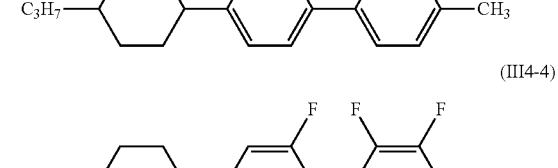
(III4-3)
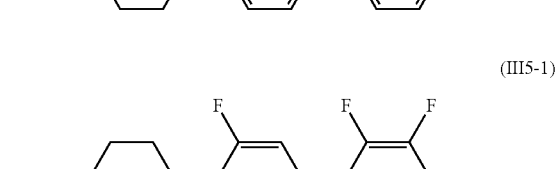
(III4-4)
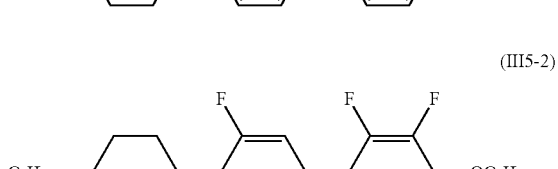
(III5-1)
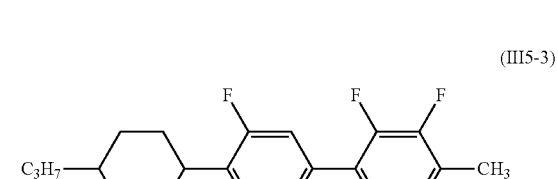
(III5-2)
(III5-3)

-continued

(III11-3)

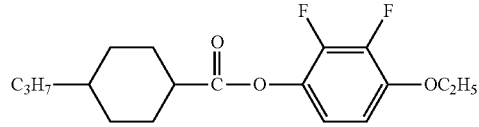
(III12-1)

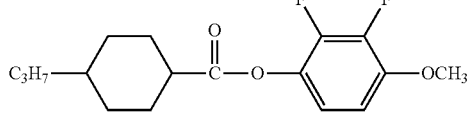
(III12-2)

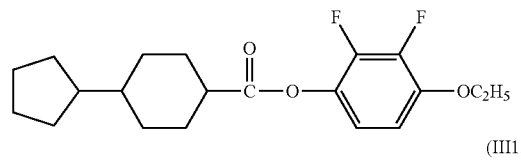
(III12-3)

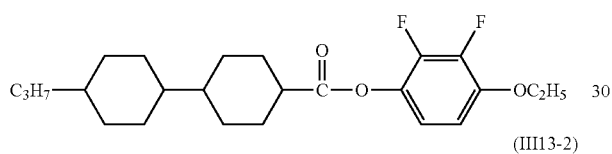
(III13-1)

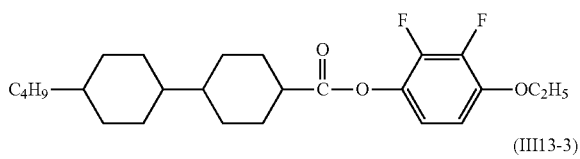
(III13-2)

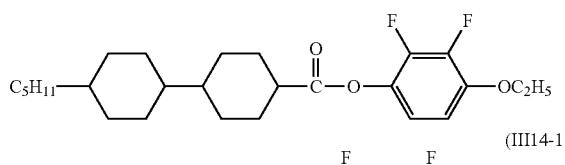
(III13-3)

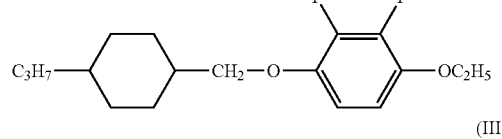
(III14-1)

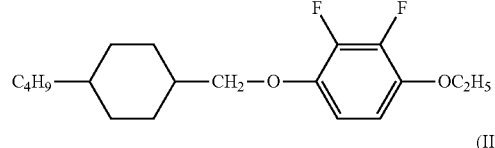
(III14-2)

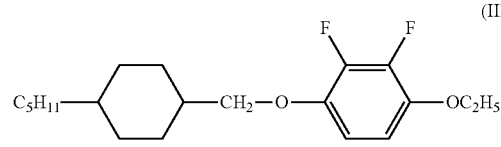
(III14-3)

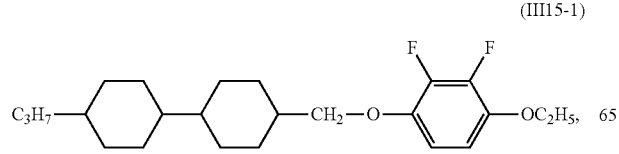
(III15-1)

-continued

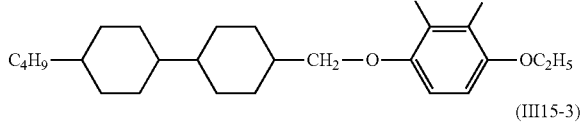
(III15-2)

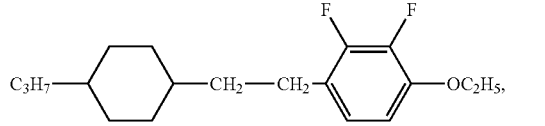
(III15-3)

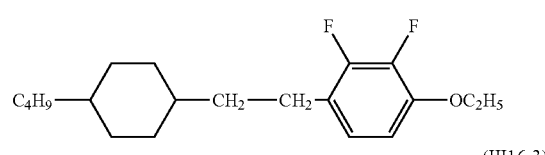
(III16-1)

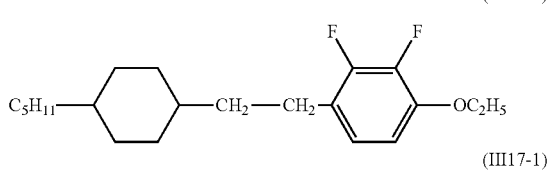
(III16-2)

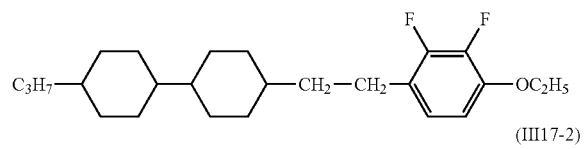
(III16-3)

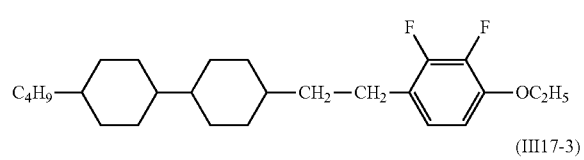
(III17-1)

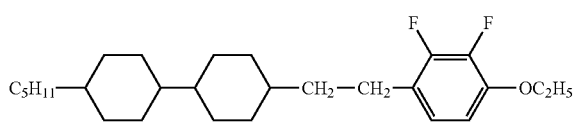
(III17-2)

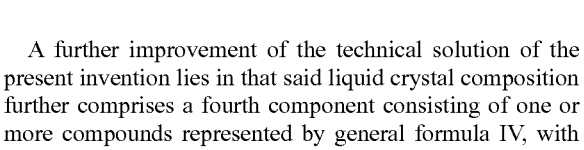
(III17-3)

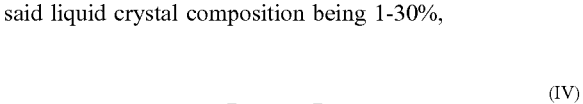

A further improvement of the technical solution of the present invention lies in that said liquid crystal composition further comprises a fourth component consisting of one or more compounds represented by general formula IV, with the content in mass percentage of said fourth component in said liquid crystal composition being 1-30%,

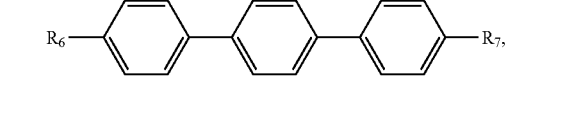
(IV)

wherein

R₆ represents a linear alkyl group having a carbon atom number of 1-5, wherein any CH₂ may be substituted with a cycloalkylene having a carbon atom number of 3-5; and R₇ represents a linear alkyl group having a carbon atom number of 1-5.

A further improvement of the technical solution of the present invention lies in that said compound represented by general formula IV is specifically a compound represented by formulas IV1 to IV5:

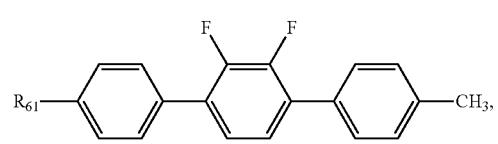
(IV1)

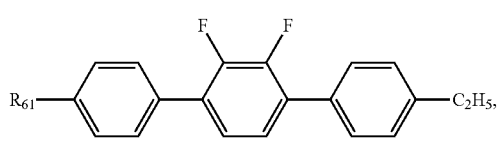
(IV2)

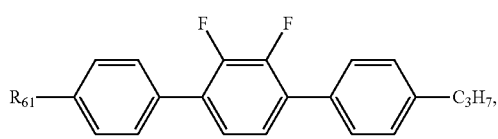
(IV3)

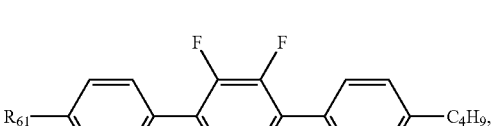
(IV4)

and

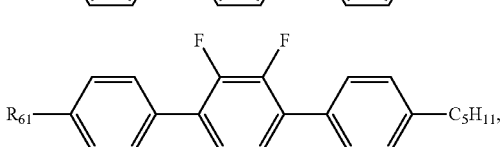
(IV5)

wherein

R₆ represents a linear alkyl group having a carbon atom number of 1-5, wherein any CH₂ may be substituted with a cycloalkylene having a carbon atom number of 3-5.

Preferably, said compound represented by general formula IV is specifically a compound represented by formulas IV1-1 to IV5-1:

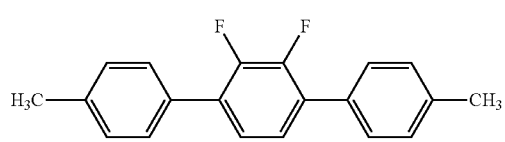
(IV1-1)

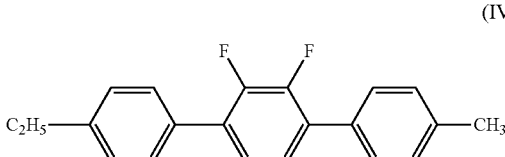
(IV1-2)

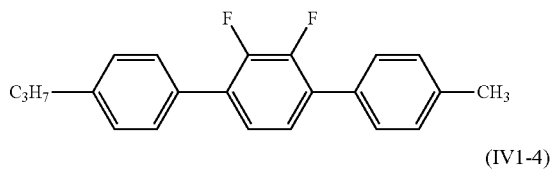
(IV1-3)

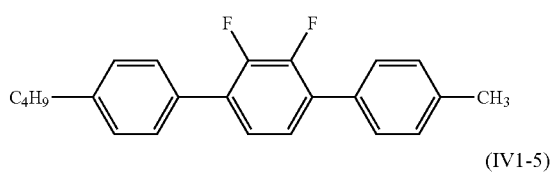
(IV1-4)

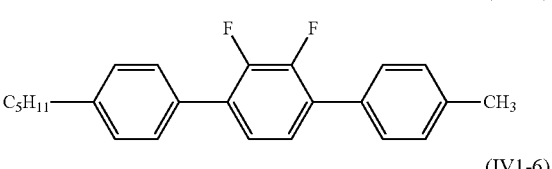
(IV1-5)

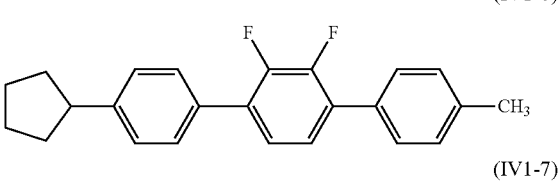
(IV1-6)

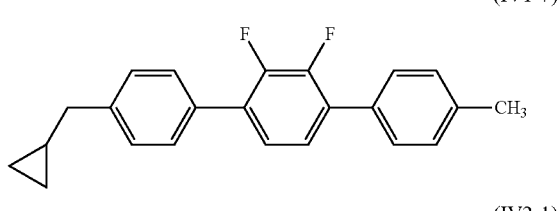
(IV1-7)

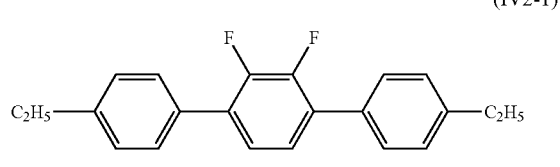
(IV2-1)

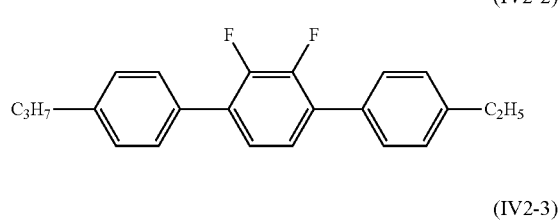
(IV2-2)

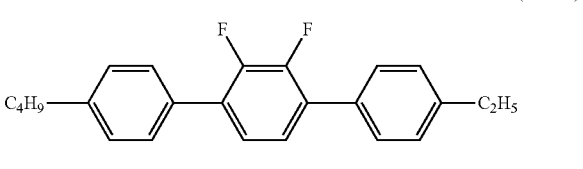
(IV2-3)

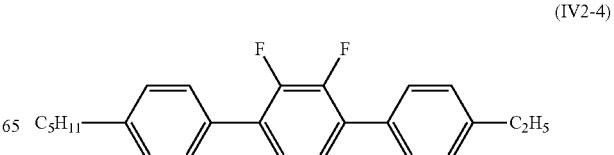
(IV2-4)

(IV2-5)
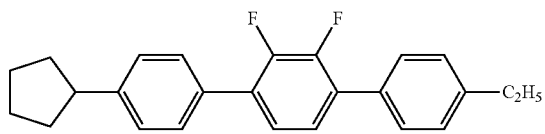

(IV2-6)
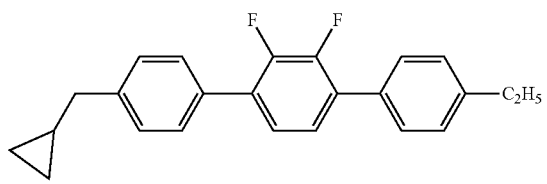

(IV3-1)
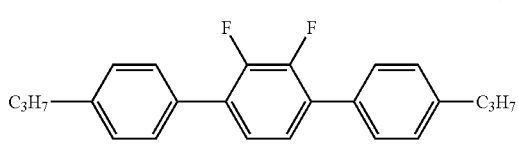

(IV3-2)

(IV3-3)
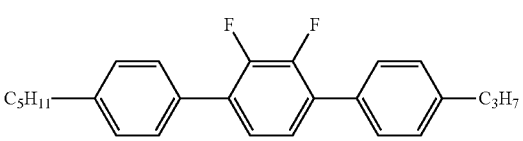

(IV3-4)
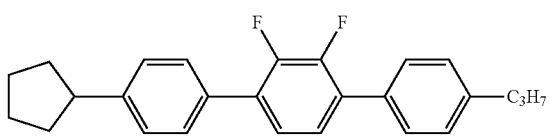

(IV3-5)
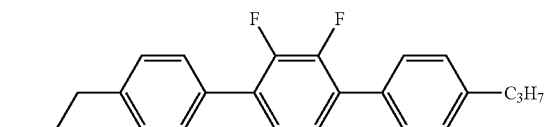

(IV4-1)
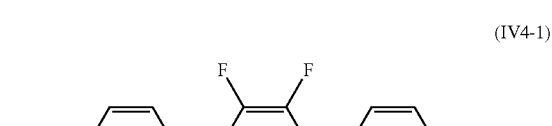

(IV4-2)
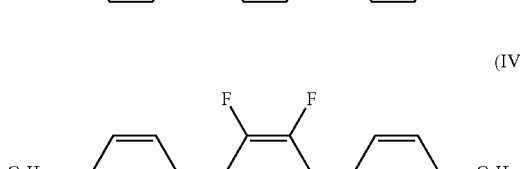

(IV5-1)
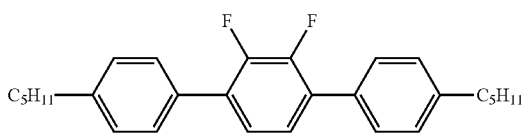

A further improvement of the technical solution of the present invention lies in that said liquid crystal composition further comprises a fifth component consisting of one or more compounds represented by general formula V, with the content in mass percentage of said fifth component in said liquid crystal composition being 1-15%, (V)
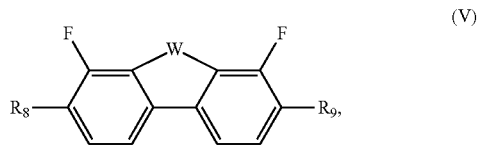

wherein $R_8$ and $R_9$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_8$ and $R_9$ may be substituted with a cycloalkylene having a carbon atom number of 3-5;

and W represents O or S.

A further improvement of the technical solution of the present invention lies in that said compound represented by general formula V is specifically a compound represented by formulas V1 to V2:

(V1)
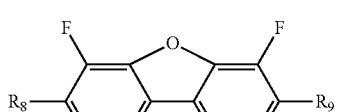 and (V2)
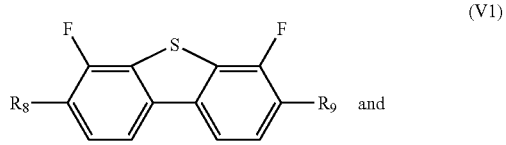

wherein $R_8$ and $R_9$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_8$ and $R_9$ may be substituted with a cycloalkylene having a carbon atom number of 3-5;

Preferably, said compound represented by general formula IV is specifically a compound represented by formulas V1-1 to V2-2:

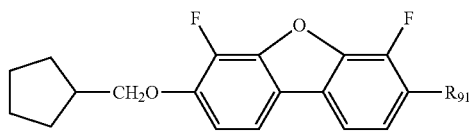
(V1-1)

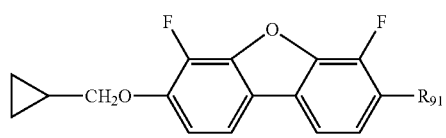
(V1-2)

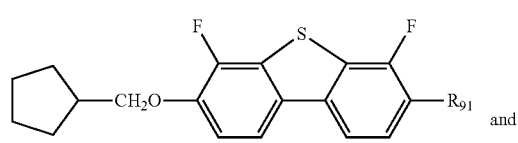
(V2-1)

and

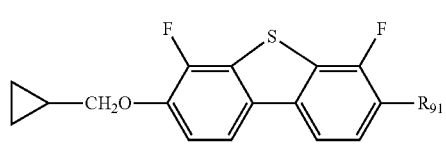
(V2-2)

A further improvement of the technical solution of the present invention lies in that said liquid crystal composition further comprises a sixth component consisting of one or more compounds represented by general formula VI, with the content in mass percentage of said sixth component in said liquid crystal composition being 1-15%,

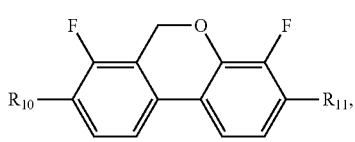
(VI)

wherein $R_{10}$ and $R_{11}$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_{10}$ and $R_{11}$ may be substituted with a cycloalkylene having a carbon atom number of 3-5.

Preferably, said compound represented by general formula IV is specifically a compound represented by formulas VI1 and VI2,

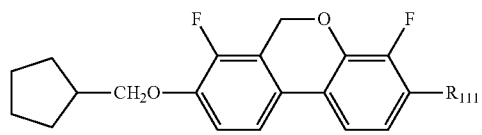
(VI1)

and

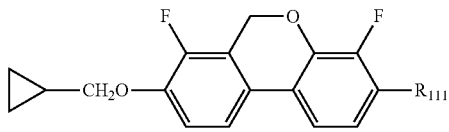
(VI2)

wherein each $R_{111}$ represents an alkoxy group having a carbon atom number of 1-5.

The present invention further discloses a liquid crystal display element or liquid crystal display comprising the above-mentioned negative dielectric anisotropy liquid crystal composition, said display element or display being an active matrix display element or display or a passive matrix display element or display.

Due to the use of the above-mentioned technical solution, the technical progress achieved by the present invention lies in that The liquid crystal medium disclosed in the present invention has an excellent performance, an optical anisotropy in the range of 0.080 to 0.150, a low rotary viscosity, a fast response time, and good chemical, optical and thermal stabilities, and is very suitable for manufacturing liquid crystal display elements or displays, particularly suitable for active matrix display elements or displays, such as active matrix displays using a VA, FFS or IPS mode.

In detail, the liquid crystal composition disclosed by the present invention has a lower viscosity and a good compatibility with other liquid crystal compounds, and has an appropriate optical anisotropy and dielectric constant anisotropy, and in the case of being used in a liquid crystal display element, the liquid crystal composition having a fast response characteristic and a liquid crystal display element containing the liquid crystal composition.

Where the various components are at different ratios, the liquid crystal compositions disclosed in the present invention will exhibit slightly different properties, in terms of dielectric anisotropy Δε, optical anisotropy Δn, transition temperature point Cp for the transformation of the nematic phase of the liquid crystal into liquid, stability at low temperatures, which may all be different, and the liquid crystal compositions can be used in different types of display devices, but the same characteristic thereof is that the rotary viscosities $γ_1$ thereof are lower. The application to liquid crystal display devices can achieve a fast response.

DETAILED DESCRIPTION OF EMBODIMENTS

The present invention is further described in detail in conjunction with particular examples below:

parts referred to in the following examples are all by weight, and the temperature unit is ° C., and the specific meanings of other symbols and the test conditions are as follows:

S-N represents the melting point (° C.) for the transformation of a liquid crystal from crystal state to nematic phase;

Cp represents the clearing point (° C.) of a liquid crystal, with the test instrument being Mettler-Toledo-FP System micro-thermal analyzer;

$γ_1$ is rotary viscosity (mPa·s), with the test conditions being: 25° C., INSTEC: ALCT-IR1, and 20 μm parallel cells or 18 μm vertical cells;

$K_{11}$ is a twist elastic constant, and $K_{33}$ is a splay elastic constant, with the test conditions being: 25° C., INSTEC: ALCT-IR1, and 20 μm parallel cells or 18 μm vertical cells;

Δε represents dielectric anisotropy, Δε=ε//−ε⊥, where ε// is a dielectric constant parallel to the molecular axis, and ε⊥ is a dielectric constant perpendicular to the molecular axis, with the test conditions being: 25° C., INSTEC: ALCT-IR1, and 20 μm parallel cells or 18 μm vertical cells;

An represents the optical anisotropy, Δn=no−ne, where no is the refractive index of an ordinary light, ne is the refractive index of an extraordinary light, with the test conditions being: 589 nm and 25±0.2° C.;

In the following Examples 1-6, liquid crystal compounds are respectively weighed in proportion to prepare liquid crystal media. All the various liquid crystal monomers used can be synthesized by means of known methods or obtained commercially.

The equipment and instruments used for preparing liquid crystal media are:
(1) electronic precision balance (accuracy: 0.1 mg)
(2) stainless steel beaker for weighing a liquid crystal
(3) spoon for adding a monomer
(4) magnetic rotor for stirring
(5) controlled-temperature electromagnetic stirrer A method for preparing a liquid crystal medium comprises the following steps:
(1) monomers to be used are placed in order neatly;
(2) a stainless steel beaker is placed on a balance, and the monomers are transferred into the stainless steel beaker by means of small spoons;
(3) the monomeric liquid crystals are added in order according to required weights;
(4) the stainless steel beaker, to which the materials have been added, is placed on a magnetic stirring instrument for heating and melting; and
(5) after the mixture in the stainless steel beaker is mostly melted, a magnetic rotor is added to the stainless steel beaker for uniformly stirring the liquid crystal mixture, and after cooling to room temperature, the liquid crystal medium is obtained.

In the examples of the invention of the present application, liquid crystal monomer structures are represented by codes, and codes for ring structures, terminal groups and linking groups of liquid crystals are represented as in Tables (I) and (II) below

TABLE I

Corresponding code for ring structure

| Ring structure | Corresponding code |
|---|---|
| 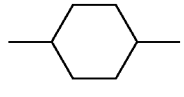 | C |
| 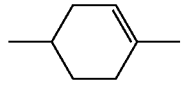 | L |
| 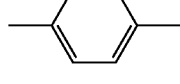 | P |
| 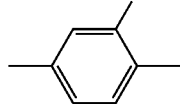 | G |

TABLE I-continued

Corresponding code for ring structure

| Ring structure | Corresponding code |
|---|---|
| 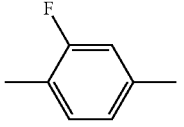 | Gl |
| 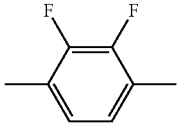 | Y |
| 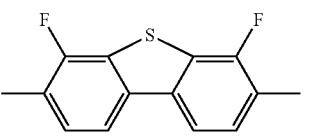 | Sc |
| 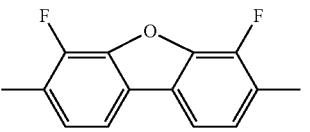 | Sb |
| 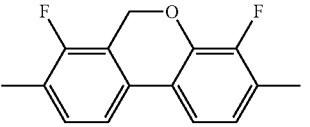 | Sa |

TABLE II

Corresponding code for terminal group and linking group

| Terminal group and linking group | Corresponding code |
|---|---|
| $C_nH_{2n+1}$— | n |
| $C_nH_{2n+1}O$— | nO |
| —$CH_2O$— | O |
| —COO— | Z |
| —$CH_2CH_2$— | E |
| —$CH_2$=$CH_2$— | V |
| 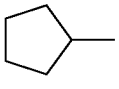 | Cp |
| 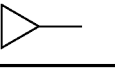 | Cpr |

For example,

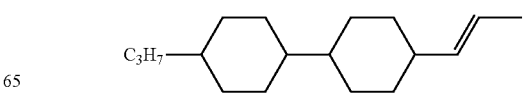

expressed as 3CCV1,

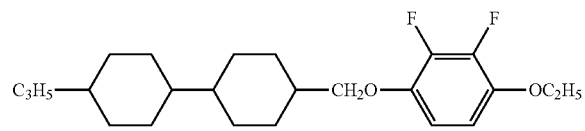

expressed as 3CCOYO2.

Example 1

| Component | General formula | Code for monomer | Monomer content/% | Performance parameter |
|---|---|---|---|---|
| First component | I | CpLYO2 | 2 | S-N: ≤−40° C. |
| | I | CpLYO3 | 2 | Cp: 75° C. |
| Second component | II | 3CCV | 37 | Δn: 0.100 |
| | II | 3CPO2 | 2 | $n_e$: 1.585 |
| | II | 3CCP1 | 7 | Δε: −3.0 |
| | II | 1VCPP2 | 4 | $\varepsilon_\perp$: 6.8 |
| Third component | III | 3CYO2 | 2 | $K_{11}/K_{33}$: |
| | III | 3CYO4 | 6 | 12.1/13.2 |
| | III | 3PYO2 | 10 | $\gamma_1$: 66.4 mPa · s |
| | III | 2CCYO2 | 4 | |
| | III | 3CCOYO2 | 14 | |
| | III | 5PPYO2 | 10 | |

Example 2

| Component | General formula | Code for monomer | Monomer content/% | Performance parameter |
|---|---|---|---|---|
| First component | I | CpLYO2 | 2 | S-N: ≤−40° C. |
| | | | | Cp: 85° C. |
| Second component | II | 3CCV | 40 | Δn: 0.100 |
| | II | 3CPO2 | 6 | $n_e$: 1.585 |
| | II | 3CCP1 | 2 | Δε: −2.9 |
| | II | 3CCPO1 | 2 | $\varepsilon_\perp$: 6.4 |
| | II | 1VCPP2 | 6 | $K_{11}/K_{33}$: |
| | II | 3CPP2 | 3 | 14.6/14.8 |
| Third component | III | 3CCOYO2 | 10 | $\gamma_1$: 87.2 mPa · s |
| | III | 2CCOYO2 | 10 | |
| | III | 3PYO2 | 2 | |
| | III | 5PPYO2 | 4 | |
| Sixth component | VI | Cp1OSaO4 | 9 | |

Example 3

| Component | General formula | Code for monomer | Monomer content/% | Performance parameter |
|---|---|---|---|---|
| First component | I | CpLYO2 | 5 | S-N: ≤−40° C. |
| | | | | Cp: 92° C. |
| Second component | II | 3CC2 | 20 | Δn: 0.116 |
| | II | 3CCPO1 | 5 | $n_e$: 1.459 |
| | II | 5CPP2 | 5 | Δε: −3.2 |
| | II | 3CPP2 | 5 | $\varepsilon_\perp$: 6.4 |
| Third component | III | 3CYO2 | 9 | $K_{11}/K_{33}$: |
| | III | 3CYO4 | 10 | 14.0/13.9 |
| | III | 2CCYO2 | 7 | $\gamma_1$: 96.8 mPa · s |
| | III | 2CPYO2 | 3 | |
| | III | 2CGIYO2 | 2 | |
| | III | 3PPYO2 | 10 | |

| Component | General formula | Code for monomer | Monomer content/% | Performance parameter |
|---|---|---|---|---|
| Fourth component | IV | 2PYP3 | 6 | |
| Sixth component | VI | Cpr1OSbO4 | 3 | |

Example 4

| Component | General formula | Code for monomer | Monomer content/% | Performance parameter |
|---|---|---|---|---|
| First component | I | CpLYO2 | 10 | S-N: ≤−40° C. |
| | I | CpLYO3 | 10 | Cp: 77° C. |
| | I | CpLYV1 | 10 | Δn: 0.113 |
| Second component | II | 3CCV | 27 | $n_e$: 1.600 |
| | II | 3CCPO1 | 6 | Δε: −4.0 |
| | II | 1VCPP2 | 2 | $\varepsilon_\perp$: 8.0 |
| Third component | III | 3CYO2 | 2 | $K_{11}/K_{33}$: |
| | III | 3CCYO2 | 5 | 14.7/15.6 |
| | III | 2CCYO2 | 8 | $\gamma_1$: 105.9 mPa · s |
| | III | 2CPYO2 | 1 | |
| | III | 3PPYO2 | 5 | |
| | III | 5PPYO2 | 5 | |
| | III | 2CCOYO2 | 3 | |
| Fourth component | IV | 2PYP3 | 2 | |
| Fifth component | V | Cpr1OScO5 | 2 | |
| Sixth component | VI | 5OSaO4 | 2 | |

Example 5

| Component | General formula | Code for monomer | Monomer content/% | Performance parameter |
|---|---|---|---|---|
| First component | I | CpLYO2 | 8 | S-N: ≤−40° C. |
| | I | CpLYO3 | 7 | Cp: 73° C. |
| Second component | II | 2CC3 | 8 | Δn: 0.124 |
| | II | 5CPP2 | 2 | $n_e$: 1.615 |
| Third component | III | 3CYO2 | 10 | Δε: −5.0 |
| | III | 5CYO2 | 15 | $\varepsilon_\perp$: 9.6 |
| | III | 5CCYO2 | 10 | $K_{11}/K_{33}$: |
| | III | 3CCYO2 | 10 | 12.4/13.3 |
| | III | 2CPYO2 | 10 | $\gamma_1$: 176.2 mPa · s |
| | III | 2PGIYO2 | 5 | |
| Fourth component | IV | 2PYP3 | 5 | |
| | IV | Cpr1PYP2 | 5 | |
| Sixth component | VI | Cp1OSaO4 | 5 | |

Example 6

| Component | General formula | Code for monomer | Monomer content/% | Performance parameter |
|---|---|---|---|---|
| First component | I | CpLYO2 | 10 | S-N: ≤−40° C. |
| | I | CpLYO3 | 5 | Cp: 66° C. |
| | I | CpLY04 | 5 | Δn: 0.101 |
| Second component | II | 3CCV | 10 | $n_e$: 1.590 |
| | II | 5CC3 | 5 | Δε: −3.3 |
| | II | 2CC3 | 20 | $\varepsilon_\perp$: 7.4 |
| | II | 3CPP2V1 | 8 | $K_{11}/K_{33}$: |
| | II | 1VCPP2 | 5 | 11.8/13.0 |

-continued

| Component | General formula | Code for monomer | Monomer content/% | Performance parameter |
|---|---|---|---|---|
| | II | 3CPP2 | 7 | $\gamma_1$: 76.4 mPa·s |
| | II | 3CCPO1 | 5 | |
| Third component | III | 3CCOYO2 | 2 | |
| Fifth component | V | CPr1OSbO4 | 4 | |
| | V | Cpr1OScO5 | 3 | |
| | V | 5OSbO2 | 3 | |
| Sixth component | VI | 5O5aO4 | 4 | |
| | VI | CPr1OSaO2 | 4 | |

Example 7

| Component | General formula | Code for monomer | Monomer content/% | Performance parameter |
|---|---|---|---|---|
| First component | I | CpLYO2 | 2 | S-N: ≤−40° C. |
| | I | CpLY3 | 2 | Cp: 79° C. |
| | I | CpLYV1 | 2 | Δn: 0.142 |
| Second component | II | 3CCV | 3 | $n_e$: 1.640 |
| | II | 2CC3 | 3 | Δε: −4.4 |
| | II | 5CC3 | 3 | $\epsilon_\perp$: 8.8 |
| | II | 3CPP2V1 | 5 | $K_{11}/K_{33}$: |
| | II | 3CPP2 | 5 | 13.4/14.4 |
| | II | 3CCPO1 | 5 | $\gamma_1$: 140.2 mPa·s |
| | II | 5PP1 | 5 | |
| | II | 3CPO2 | 5 | |
| Third component | III | 3CYO2 | 5 | |
| | III | 3PYO2 | 5 | |
| | III | 2OPYO2 | 5 | |
| | III | 3CCYO2 | 5 | |
| | III | 3CPYO2 | 5 | |
| | III | 3CGIYO4 | 5 | |
| | III | 5PPYO2 | 5 | |
| | III | 3PGIYO4 | 5 | |
| | III | 2CCOYO2 | 3 | |
| | III | 3COYO2 | 4 | |
| Fourth component | IV | 2PYP3 | 2 | |
| | IV | Cpr1PYP3 | 2 | |
| Fifth component | V | Cpr1OScO5 | 2 | |
| | V | 5OSbO2 | 2 | |
| Sixth component | VI | 5OSaO4 | 2 | |
| | VI | CPr1OSaO2 | 3 | |

Example 8

| Component | General formula | Code for monomer | Monomer content/% | Performance parameter |
|---|---|---|---|---|
| First component | I | CpLYO2 | 10 | S-N: ≤−40° C. |
| | | | | Cp: 72° C. |
| Second component | II | 3CCV | 30 | Δn: 0.103 |
| | II | 1VCPP2 | 5 | $n_e$: 1.590 |
| Third component | III | 3CYO4 | 10 | Δε: −3.8 |
| | III | 5CYO2 | 4 | $\epsilon_\perp$: 7.9 |
| | III | 5CCYO2 | 8 | $K_{11}/K_{33}$: 11.4/11.8 |
| | III | 3CCYO2 | 8 | $\gamma_1$: 86.2 mPa·s |
| | III | 2CPYO2 | 7 | |
| | III | 3CPYO2 | 8 | |
| Fourth component | IV | 2PYP3 | 5 | |
| Sixth component | VI | CPr1OSaO4 | 5 | |

Comparative Example 1 with Respect to Example 8

| Component | General formula | Code for monomer | Monomer content/% | Performance parameter |
|---|---|---|---|---|
| — | — | 3LYO2 | 10 | S-N: ≤−40° C. |
| Second component | II | 3CCV | 30 | Cp: 70° C. |
| | II | 1VCPP2 | 5 | Δn: 0.101 |
| Third component | III | 3CYO4 | 10 | $n_e$: 1.589 |
| | III | 5CYO2 | 4 | Δε: −3.8 |
| | III | 5CCYO2 | 8 | $\epsilon_\perp$: 7.7 |
| | III | 3CCYO2 | 8 | $K_{11}/K_{33}$: 12.8/14.0 |
| | III | 2CPYO2 | 7 | $\gamma_1$: 84.5 mPa·s |
| | III | 3CPYO2 | 8 | |
| Fourth component | IV | 2PYP3 | 5 | |
| Sixth component | VI | CPr1OSaO4 | 5 | |

Comparative Example 2 with Respect to Example 8

| Component | General formula | Code for monomer | Monomer content/% | Performance parameter |
|---|---|---|---|---|
| Third component | III | CpCYO2 | 10 | S-N: ≤−40° C. |
| | | | | Cp: 72° C. |
| Second component | II | 3CCV | 30 | Δn: 0.100 |
| | II | 1VCPP2 | 5 | $n_e$: 1.586 |
| Third component | III | 3CYO4 | 10 | Δε: −3.8 |
| | III | 5CYO2 | 4 | $\epsilon_\perp$: 7.9 |
| | III | 5CCYO2 | 8 | $K_{11}/K_{33}$: 11.1/11.6 |
| | III | 3CCYO2 | 8 | $\gamma_1$: 93.7 mPa·s |
| | III | 2CPYO2 | 7 | |
| | III | 3CPYO2 | 8 | |
| Fourth component | IV | 2PYP3 | 5 | |
| Sixth component | VI | CPr1OSaO4 | 5 | |

Comparative Example 3 with Respect to Example 8

| Component | General formula | Code for monomer | Monomer content/% | Performance parameter |
|---|---|---|---|---|
| Third component | III | 3CYO2 | 10 | S-N: ≤−40° C. |
| | | | | Cp: 70° C. |
| Second component | II | 3CCV | 30 | Δn: 0.099 |
| | II | 1VCPP2 | 5 | $n_e$: 1.584 |
| Third component | III | 3CYO4 | 10 | Δε: −3.8 |
| | III | 5CYO2 | 4 | $\epsilon_\perp$: 7.9 |
| | III | 5CCYO2 | 8 | $K_{11}/K_{33}$: 10.1/11.2 |
| | III | 3CCYO2 | 8 | $\gamma_1$: 85.2 mPa·s |
| | III | 2CPYO | 7 | |
| | III | 3CPYO2 | 8 | |
| Fourth component | IV | 2PYP3 | 5 | |
| Sixth component | VI | CPr1OSaO4 | 5 | |

Comparative Example 4 with Respect to Example 8

| Component | General formula | Code for monomer | Monomer content/% | Performance parameter |
|---|---|---|---|---|
| — | — | 3CLYO2 | 10 | S-N: ≤−40° C. |
| Second component | II | 3CCV | 30 | Cp: 80° C. |
| | II | 1VCPP2 | 5 | Δn: 0.106 |

-continued

| Component | General formula | Code for monomer | Monomer content/% | Performance parameter |
|---|---|---|---|---|
| Third component | III | 3CYO4 | 10 | $n_e$: 1.593 |
|  | III | 5CYO2 | 4 | $\Delta\varepsilon$: −3.8 |
|  | III | 5CCYO2 | 8 | $\varepsilon_\perp$: 7.7 |
|  | III | 3CCYO2 | 8 | $K_{11}/K_{33}$: 13.3/14.5 |
|  | III | 2CPYO2 | 7 | $\gamma_1$: 115.2 mPa · s |
|  | III | 3 CPYO2 | 8 |  |
| Fourth component | IV | 2PYP3 | 5 |  |
| Sixth component | VI | CPr1OSaO4 | 5 |  |

Comparative Example 5 with Respect to Example 8

| Component | General formula | Code for monomer | Monomer content/% | Performance parameter |
|---|---|---|---|---|
| Third component | III | 3PYO2 | 10 | S-N: ≤−40° C. |
|  |  |  |  | Cp: 69° C. |
| Second component | II | 3CCV | 30 | $\Delta n$: 0.105 |
|  | II | 1VCPP2 | 5 | $n_e$: 1.594 |
| Third component | III | 3CYO4 | 10 | $\Delta\varepsilon$: −3.7 |
|  | III | 5CYO2 | 4 | $\varepsilon_\perp$: 8.0 |
|  | III | 5CCYO2 | 8 | $K_{11}/K_{33}$: 10.2/10.8 |
|  | III | 3CCYO2 | 8 | $\gamma_1$: 84.0 mPa · s |
|  | III | 2CPYO2 | 7 |  |
|  | III | 3CPYO2 | 8 |  |
| Fourth component | IV | 2PYP3 | 5 |  |
| Sixth component | VI | CPr1OSaO4 | 5 |  |

As can be seen from the above comparative examples with respect to Example 8, the liquid crystal composition of the present invention has a higher refractive index and a lower rotary viscosity $\gamma_1$ that those with cyclopentyl and alkyl-based CYs and alkyl-based LYs, and although the liquid crystal composition has a low refractive index and clearing point with respect to those with alkyl-based CLYs, the rotary viscosity $\gamma_1$ thereof is particularly low; the liquid crystal composition of the present invention when applied to liquid crystal display can achieve a fast response, and is particularly suitable for liquid crystal materials for VA, IPS, and FFS modes.

The invention claimed is:

1. A liquid crystal composition, wherein said liquid crystal composition comprises a first component consisting of one or more compounds represented by general formula I, a second component consisting of one or more compounds represented by general formula II, and a third component consisting of one or more compounds represented by general formula III:

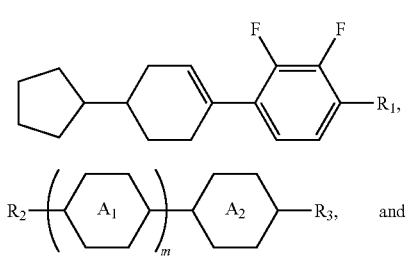

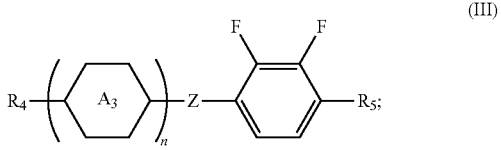

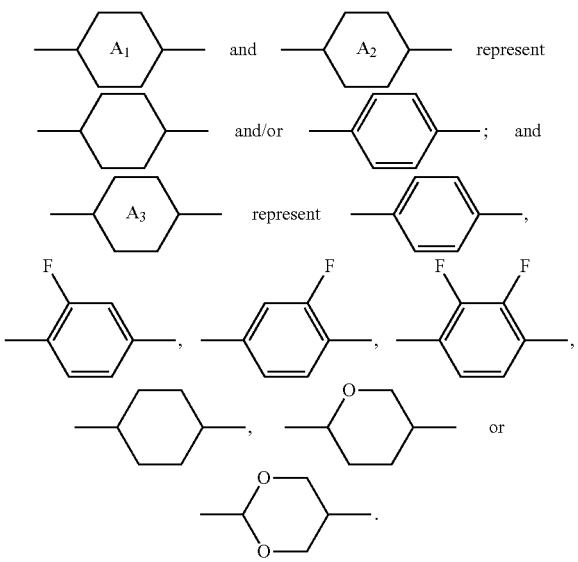

wherein $R_1$, $R_2$, $R_3$, $R_4$ and $R_5$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_4$ and $R_5$ may be substituted with a cycloalkylene having a carbon atom number of 3-5;

m represents 1 or 2, and n represents 0 or 1;

Z represents a single bond, —COO—, —$CH_2O$— or —$CH_2CH_2$—;

2. The liquid crystal composition according to claim 1, wherein said liquid crystal composition, the content in mass percentage of said first component is 1-30%, the content in mass percentage of said second component is 10-65%, and the content in mass percentage of said third component is 1-50%.

3. The liquid crystal composition according to claim 1, wherein said compound represented by general formula I is a compound represented by formulas I1 to I3:

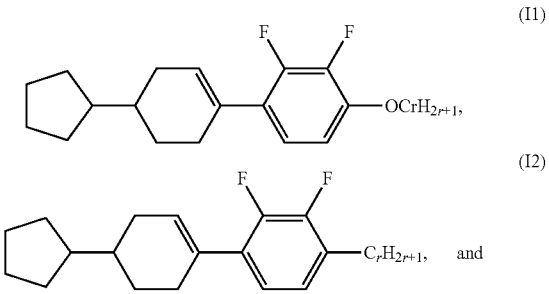

-continued
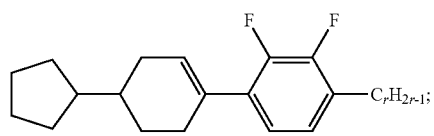     (I3)
said compound represented by general formula II is a compound represented by formulas II1 to II5,
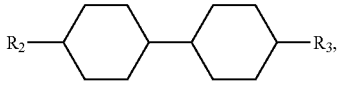    (II1)
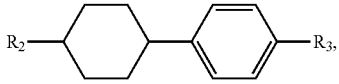    (II2)
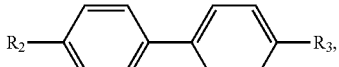    (II3)
    (II4)
and
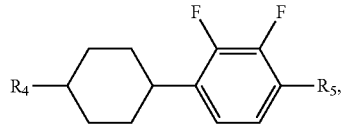    (II5)
said compound represented by general formula III is a compound represented by formulas III1 to III17,
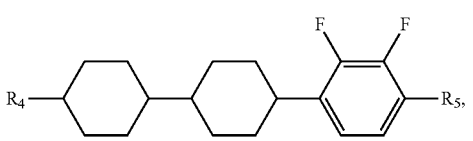    (III1)
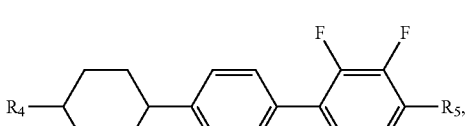    (III2)
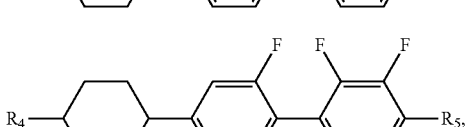    (III3)
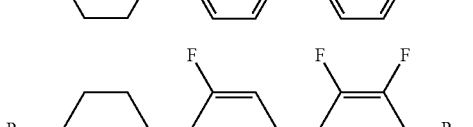    (III4)
(III5)
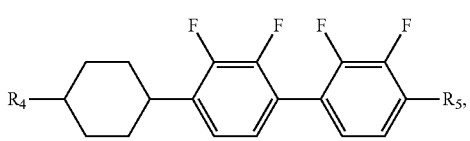    (III6)
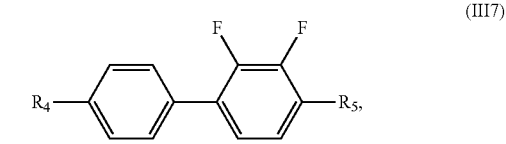    (III7)
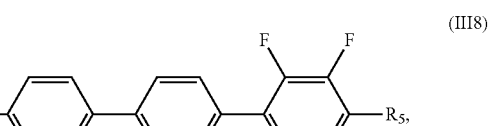    (III8)
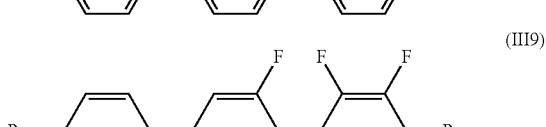    (III9)
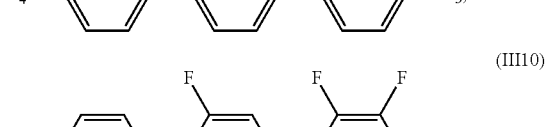    (III10)
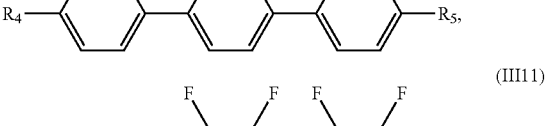    (III11)
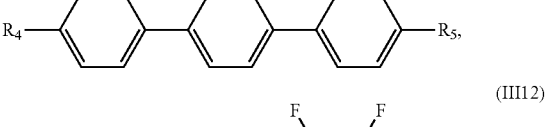    (III12)
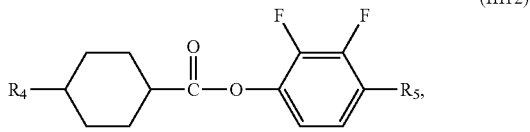    (III13)
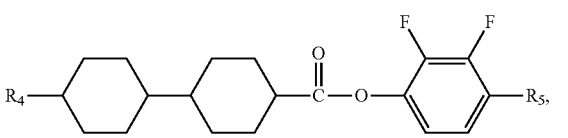    (III14)
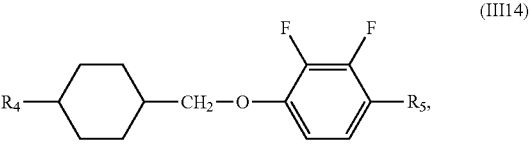    (III15)
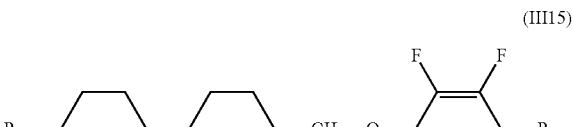    (III16)
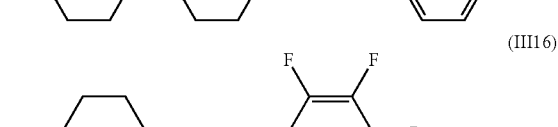    and -continued (III17)

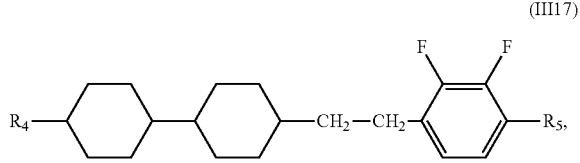

wherein r represents an integer of 1 to 5; and $R_2$, $R_3$, $R_4$ and $R_5$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_4$ and $R_5$ may be substituted with a cycloalkylene having a carbon atom number of 3-5.

4. The liquid crystal composition according to claim 1, wherein said liquid crystal composition further comprises a fourth component consisting of one or more compounds represented by general formula IV, with the content in mass percentage of said fourth component being 1-30%, (IV)

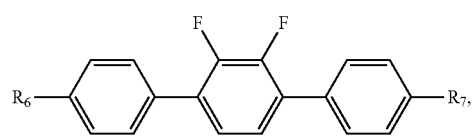

wherein $R_6$ represents a linear alkyl group having a carbon atom number of 1-5, wherein any $CH_2$ may be substituted with a cycloalkylene having a carbon atom number of 3-5; and $R_7$ represents a linear alkyl group having a carbon atom number of 1-5.

5. The liquid crystal composition according to claim 4, wherein said compound represented by general formula IV is a compound represented by formulas IV1 to IV5:

(IV1)

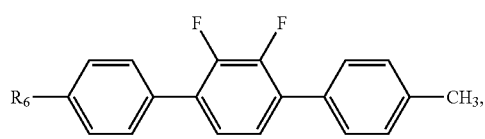

(IV2)

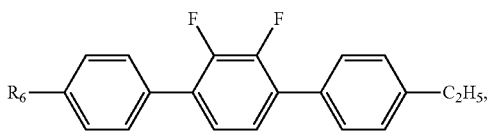

(IV3)

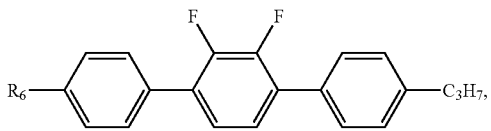

-continued (IV4)

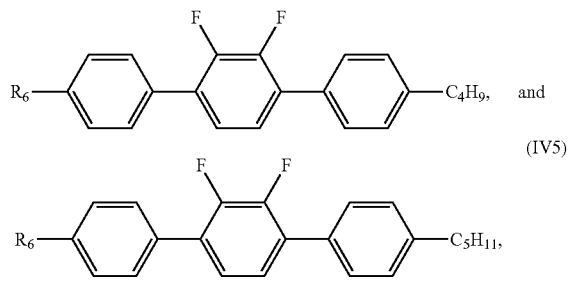

and (IV5)

wherein $R_6$ represents a linear alkyl group having a carbon atom number of 1-5, wherein any $CH_2$ may be substituted with a cycloalkylene having a carbon atom number of 3-5.

6. The liquid crystal composition according to claim 1, wherein said liquid crystal composition further comprises a fifth component consisting of one or more compounds represented by general formula V, with the content in mass percentage of said fifth component being 1-15%, (V)

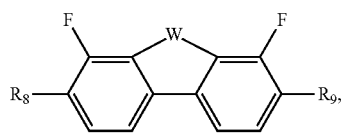

wherein $R_8$ and $R_9$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_8$ and $R_9$ may be substituted with a cycloalkylene having a carbon atom number of 3-5;

and W represents O or S.

7. The liquid crystal composition according to claim 1, wherein said liquid crystal composition further comprises a sixth component consisting of one or more compounds represented by general formula VI, with the content in mass percentage of said sixth component being 1-15%, (VI)

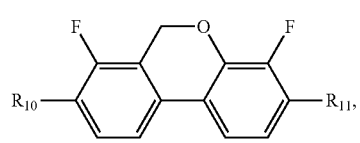

wherein $R_{10}$ and $R_{11}$ each independently represent an alkyl group having a carbon atom number of 1-5, an alkoxy group having a carbon atom number of 1-5 or an alkenyl group having a carbon atom number of 2-5, wherein any $CH_2$ in the groups represented by $R_{10}$ and $R_{11}$ may be substituted with a cycloalkylene having a carbon atom number of 3-5.

8. A liquid crystal display element or liquid crystal display comprising the liquid crystal composition of claim 1, wherein said display element or display is an active matrix display element or display or a passive matrix display element or display.

9. The liquid crystal display element or liquid crystal display according to claim 8, wherein said active matrix display element or display is a TN-TFT, IPS-TFT or VA-TFT liquid crystal display element or display.

* * * * *